Dec. 16, 1969 M. H. CROWELL ET AL 3,483,942

ACOUSTIC DEVICES

Filed May 3, 1968 2 Sheets-Sheet 1

INVENTORS
M. H. CROWELL
D. MAYDAN

BY [signature]

ATTORNEY

United States Patent Office 3,483,942

Patented Dec. 16, 1969

3,483,942

ACOUSTIC DEVICES

Merton H. Crowell, Morristown, and Dan Maydan, Berkeley Heights, N.J., assignors to Bell Telephone Laboratories Incorporated, Murray Hill, N.J., a corporation of New York Filed May 3, 1968, Ser. No. 726,508

Int. Cl. G10k *11/00;* G01v *1/00;* H03h *7/38*

U.S. Cl. 181—.5 3 Claims

ABSTRACT OF THE DISCLOSURE

The specification describes a mechanism for overcoming acoustic impedance mismatch between different acoustic media. This is based on the discovery of an acoustic Brewster's angle wherein a polarized elastic shear wave will experience no reflection at an interface between two dissimilar materials if it is incident at the proper angle.

This invention resides in the recognition of a fundamental property of acoustic waves and is broadly applicable to all types of acoustic devices.

Acoustic mismatch between different materials has been a significant problem in connection with the design of acoustic devices such as delay lines. The relatively recent discovery of the acoustic wave amplifier and the current emphasis on acousto-optic devices for light modulation indicates that this problem will become even more critical as acoustic devices become more important.

Acoustic mismatch occurs at any interface or boundary where the acoustic properties are abruptly altered and is manifested most simply by a significant reflection in the incident wave. Mode conversion also occurs in both the reflected and transmitted beam. These phenomena have been recognized for some time and many acoustic devices have been designed which make use of acoustic reflections and even mode conversion. However, as a rule, acoustic reflection is to be avoided and a mechanism for eliminating or largely reducing reflections would be welcomed in the art as a valuable contribution.

The present invention is directed to reducing or largely eliminating acoustic wave reflection between homogenous or inhomogeneous media. It is based upon the discovery of a critical angle of incidence which bears a striking resemblance to the Brewster angle for optical radiation. It has been found that a boundary condition between certain media can be prescribed such that the acoustic energy is transmitted across the interface with negligible, or unexpectedly small, loss through reflection. Mode conversion is also essentially eliminated. This condition is obtainable only with shear wave propagation. In some respects a shear wave resembles a transversely polarized light wave and some of the same considerations apply to its behavior at a dielectric discontinuity as apply to light. If the polarization of the shear wave is parallel to the surface the analogy to the Brewster angle condition is more direct and this restriction is imposed on the acoustic case described herein.

These and other aspects of this invention will be more fully explained in the following detailed description. In the drawing.

Figure 1:
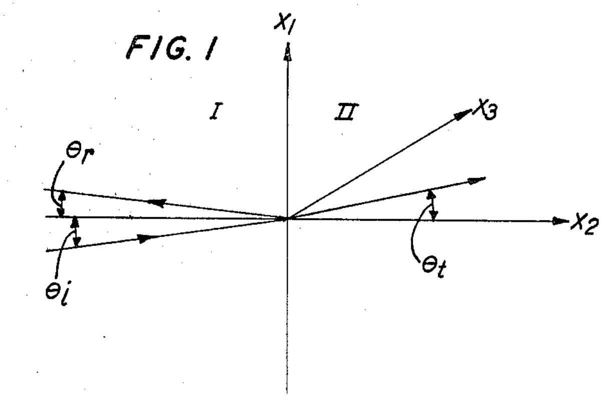
FIG. 1 is a vector diagram useful for an analysis of acoustic wave behavior at an interface.

With the aid of FIG. 1 the behavior of an acoustic wave at a dielectric interface between two isotropic media can be rigorously analyzed. The interface exists at $X_2=0$ with medium I along $X_2<0$ and medium II along $X_2>0$. In both media the particle motions are only in the $X_3$ direction. For the incident wave the displacement $U_3{}^i$ is equal to $$u_3{}^i=A_i \exp\left[j\Omega\left(t-\frac{x_1 \sin\theta_i+x_2\cos\theta_i}{v_1}\right)\right] \quad (1)$$

where $A_i$ is the amplitude of the incident wave
$\Omega$ is the acoustic angular frequency
$v_1$ is the velocity of the incident wave in medium I.

The displacements of the reflected and transmitted waves have the form $$u_3{}^r=A_r \exp\left[j\Omega\left(t-\frac{x_1 \sin\theta_r-x_2\cos\theta_r}{v_1}\right)\right] \quad (2)$$

$$u_3{}^t=A_t \exp\left[j\Omega\left(t-\frac{x_1 \sin\theta_t+x_2\cos\theta_t}{x_2}\right)\right]$$

where $v_2$ is the velocity of the transverse wave in medium II.

Boundary conditions require continuity of displacements, velocity and stress across the interface. Continuity of velocity and displacement lead to:

$$A_i+A_r=A_t \quad (3)$$

$$\frac{v_1}{\sin\theta_i}=\frac{v_1}{\sin\theta_r}=\frac{v_2}{\sin\theta_t}. \quad (4)$$

It is seen from Equation 4 that $\theta_i=\theta_r$.

Continuity of the shear stress leads to the condition.

$$(A_i-A_r)\rho_1 v_1\cos\theta_i=A_t\rho_2 v_2\cos\theta_t \quad (5)$$

where $\rho_1$ and $\rho_2$ are the densities of media I and II. Relations between $A_i$, $A_r$ and $A_t$ could be derived from Equations 3, 4 and 5.

$$A_r=\frac{\rho_1\sin 2\theta_i-\rho_2\sin 2\theta_t}{\rho_1\sin 2\theta_i+\rho_2\sin 2\theta_t}A_i \quad (6)$$

$$A_t=\frac{2\rho_i\sin 2\theta_i}{\rho_1\sin 2\theta_i+\rho_2\sin 2\theta_t}A_i \quad (7)$$

For the special case of an incident angle defined by $$\tan^2\theta_i=\left(\frac{v_1}{v_2}\right)^2\frac{1-\left(\frac{\rho_1 v_1}{\rho_2 v_2}\right)^2}{1-\left(\frac{v_1}{v_2}\right)^2} \quad (8)$$

there is no reflected wave and $A_i=A_t$. Whereas this equation specifies an exact angle of incidence $\theta_1$ it is sufficient in practice that the angle of incidence be equal to $\theta_i$ within the nearest whole degree, $\pm 1°$.

A necessary and sufficient condition for the Brewster acoustic angle to exist is that tan $^2\theta_i$ should be a positive real number or $$\frac{1-\frac{\rho_1 v_1}{\rho_2 v_2}}{1-\frac{v_2}{v_1}}\leq 0 \quad (9)$$

In an infinitely extended anisotropic medium, for any chosen direction for the wave normal, there are three possible displacement vectors independent of each other. The three vectors form a mutually orthogonal set belonging to three different waves propagating at different velocities. When a wave is reflected at an interface of an anisotropic medium, boundary conditions could require the transmission and reflection of two transverse and one longitudinal waves. The general laws for acoustic waves propagating in crystalline media are well known. For each type of crystal certain directions could be found for which pure waves could propagate. A pure wave being defined here as the one for which both the polarization is perpendicular or coincides with the direction of the wave normal, and the directions of propagation for energy and wave normal coincide.

If the second medium only is a single crystal, and assuming a transmitted wave propagating in a direction where a pure transverse wave could propagate, for the case where the polarization is parallel to the surface, the incident reflected and transmitted waves will again consist of only one transverse wave described by Equations 1 and 2.

The equations of motion are:

$$\frac{\partial \sigma_{ij}}{\partial x_i} = \rho \ddot{v}_j (i,j=1,2,3) \qquad (10)$$

where $\sigma_{ij}$ are the stress components and $v_j$ are the displacement vectors.

For undispersive, homogeneous crystals Hooke's law relating the stress and strain is $$\sigma_{ij} = c_{ijkl}\epsilon_{kl}(i,j,k,l=1,2,3) \qquad (11)$$

where $c_{ijkl}$ are the stiffness constants of the materials and $\epsilon_{kl}$ are the strain components.

The stress components are:

$$\epsilon_{kl} = \frac{1}{2}\left(\frac{\partial u_k}{\partial x_l} + \frac{\partial u_l}{\partial x_k}\right) \qquad (12)$$

Using Equations 11 and 12 the equation of motion becomes $$\frac{1}{2} c_{ijkl} \frac{\partial}{\partial x_i}\left(\frac{\partial u_k}{\partial x_l} + \frac{\partial u_l}{\partial x_k}\right) = \rho \ddot{v}_i \qquad (13)$$

The solution of Equation 13 is $$u_i = m_i A_i \exp\left[j\Omega\left(t - \frac{l_1x_1 + l_2x_2 + l_3x_3}{v}\right)\right] \qquad (14)$$

where $l_i$ are the direction cosines of the wave normals and $m_i$ are the direction cosines of the displacement vectors. Substituting the solution of Equation 13 into Equation 14 results in the set of equations $$(\Gamma_{ik} - \delta_{jk}\rho v^2)m_j = 0 \qquad (15)$$

with $$\Gamma_{ik} = l_j l_l c_{ijkl}$$

and $$\delta_{jk} = \begin{cases} 0 & k \neq j \\ 1 & k = j \end{cases}$$

The equation relating the direction cosines of displacements and velocities derived from Equation 14, are:

$$\Gamma_{ij} m_l = m_j \rho v^2 \qquad (16)$$

For a wave propagating in the $x_2$ directions $$(l_2 = 1, \ l_1 = l_3 = 0)$$

with a displacement in the $x_3$ direction $$(m_3 = 1, \ m_1 = m_2 = 0)$$

the velocity is $$\rho v^2 = c_{2323} \qquad (17)$$

For the case described, where the first medium is isotropic and the second is a single crystal, continuity of velocity, and displacement at the boundary leads to:

$$\theta_r = \theta_i$$

$$\frac{\sin \theta_t}{v_2} = \frac{\sin \theta_i}{v_1} \qquad (18)$$

and $$A_i + A_r = A_t$$

Continuity of stress requires the equality of $\sigma_{23}$ in medium I to $\sigma_{23}$ in medium II.

Figures 2, 3:
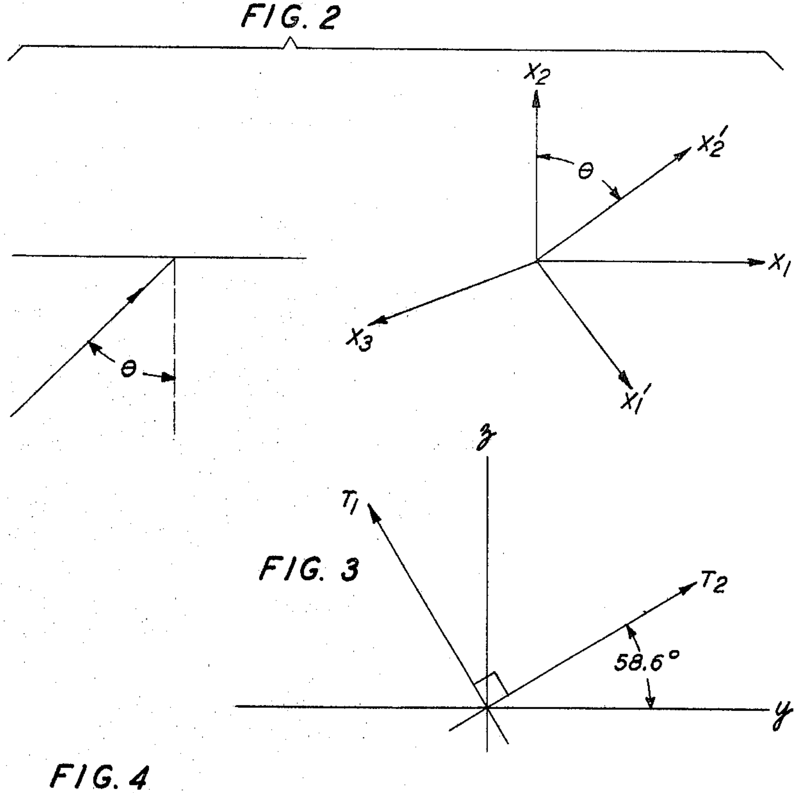
FIG. 2 is a vector diagram of a shear wave propagating in a solid with an arbitrary direction related to the major axes by $\theta$ and is used in a further analysis relating to FIG. 1.
FIG. 3 is a diagram showing the displacement directions in sapphire for transverse wave propagation in the X-direction.

For a pure transverse wave propagating in any solid in a random direction $\theta$ the vectors are represented in FIG. 2. The shear stress component at the interface is:

$$\sigma_{23} = \cos \theta \sigma'_{23} \qquad (19)$$

where $\sigma'_{23}$ is the stress component related to an orthogonal set of axes $x_1'$, $x_2'$, $x_3$ as defined in FIG. 2.

In the new set of axes, using Equations 11, 12 and 16

$$\sigma'_{23} = D_{2323} \frac{\partial u_3}{\partial x_2'} = \rho v^2 \frac{\partial u_3}{\partial x_2'} \qquad (20)$$

where $D_{ijkl}$ are the stiffness constants related to the $x_1'$, $x_2'$ and $x_3$ set of axes.

Using Equation 20, the continuity of stress across the interface is defined by the condition $$(A_i - A_r)\rho_1 v_1 \cos \theta_i = A_t \rho_2 v_2 \cos \theta_t \qquad (21)$$

This result is identical with the one obtained for the two isotropic media so that the Brewster acoustic angle is unchanged.

If both media are single crystals with directions chosen so that the incident and one of the transmitted waves are pure transverse with polarization parallel to the surface, the reflected and the rest of the transmitted waves will generally have displacement vectors which are not along or normal to the wave vectors. Continuity of displacements and stress across the boundary leads to a set of six equations which can be solved for each individual case. Using the same arguments as before, if the incident pure wave propagates in the Brewster acoustic angle defined by Equation 8, only one transmitted wave will exist, provided that crystal orientation allows the propagation of pure transverse waves in the direction $\theta_t$ defined by Snell's law. In this case all the energy is transmitted without any reflections.

Because of the large difference in acoustic impedances between fused quartz and sapphire these two media were chosen to demonstrate the transmission of acoustic energy without reflections. The velocity of a transverse acoustic wave in fused quartz is $v_{tr} = 3.77 \times 10^5$ cm./sec. and the density $\rho_1 = 2.2$ gm./cm.$^3$.

The sapphire is a trigonal crystal with constants of elasticity and density equal to $$c_{11} = 496.8$$
$$c_{33} = 498.1$$
$$c_{44} = 147.4$$
$$c_{13} = 110.9$$
$$c_{14} = -23.8$$

(all in $10^{10}$ dyn./cm.$^2$), $\rho_2 = 4.0$ gm./cm.$^3$. In trigonal crystals the $x$-axis is one of the directions where pure transverse waves can propagate. The velocities, and polarization vectors of the transverse waves can be found from Equations 15 and 16. For those waves propagating along the $x$-axis the velocities derived are:

$$v_{t1} = 6.75 \times 10^5 \text{ cm./sec.}, \ v_{t2} = 5.72 \times 10^5 \text{ cm./sec.}$$

and for the smaller velocity the polarization vector is in the $y$, $z$ plane forming an angle of 58.6° with the $y$-axis. This case is described by FIG. 3.

For a normal incident angle, with the transverse wave $T_2$, in the sapphire propagating along the $x$-axis, the ratio between the two impedances is $$Z=\frac{\rho_2 v_{t2}}{\rho_1 v_{t1}}=2.76 \quad (22)$$

the ratio between reflected, incident and transmitted waves are:

$$\frac{A_t}{A_i}=\frac{2}{Z+1}=0.53$$

$$\frac{A_r}{A_i}=\frac{Z-1}{Z+1}=0.47 \quad (23)$$

Figure 4:
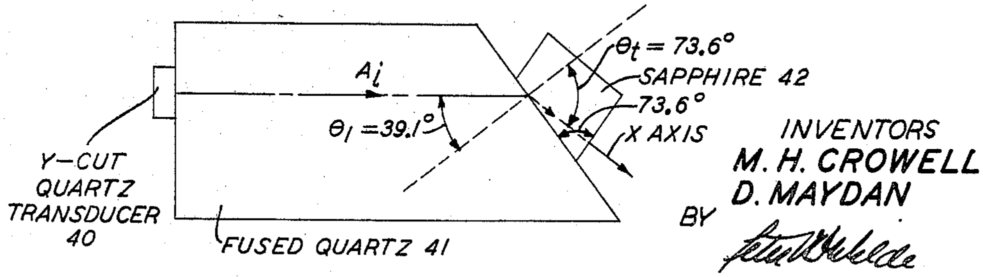
FIG. 4 is a schematic representation of an acoustic model for demonstrating the acoustic behavior at the interface between different media.
Figure 5:
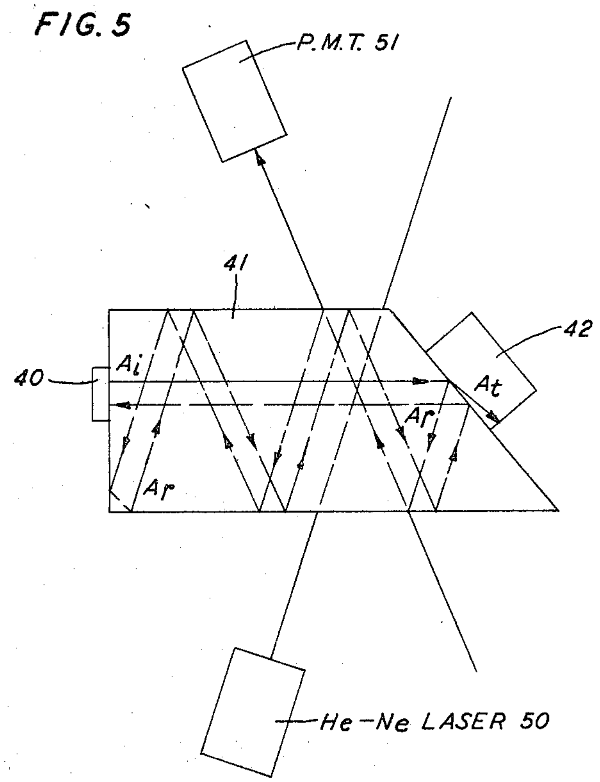
FIG. 5 is a schematic representation showing an apparatus used to measure the reflected and transmitted wave energies for the model of FIG. 4.

The Brewster incident angle for this case is found from Equation 8 to be $\theta_i=39.1°$ and the transmitted angle $\theta_t=73.6°$. The apparatus used to demonstrate the principles described above and to verify the existence of the Brewster's acoustic angle is shown in FIGS. 4 and 5. FIG. 4 shows a composite crystal arrangement with a standard Y-cut quartz piezoelectric transducer 40 having a fundamental frequency of about 100 mc./sec. attached to a fused quartz acoustic transmission medium 41. The medium 41 is cut so that a shear wave represented by $A_i$ would be incident on the exit face at the critical Brewster's acoustic angle, $\theta_i=39.1$. The sapphire body 42, which is acoustically mismatched by ordinary standards to a considerable degree with respect to fused quartz, is cut so that the transmitted beam represented by $A_t$ will be incident on its exit face at approximately 90°. This requires a prism having two faces cut at the angle of transmission with respect to the normal, $\theta_t$, which in this case is 73.6°.

Figure 6:
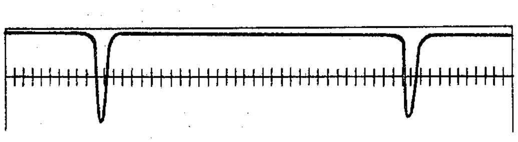
FIGS. 6 and 7 are plots of acoustic energy versus time obtained from the apparatus of FIG. 5.
Figure 7:
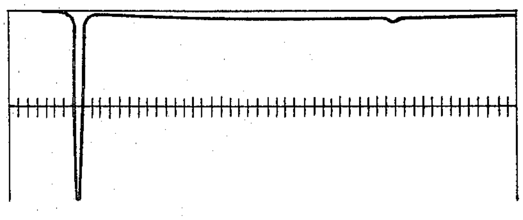

Acoustic beam probing using optical techniques was found to be a convenient way to measure the ratio between the reflected and transmitted energies of the incident beam $A_i$ of FIG. 4. The apparatus used for this measurement is shown in FIG. 5. A 6328 A. He-Ne laser 50 was arranged with its output beam incident at the Bragg angle on the acoustic beam in medium 41. Light diffracted from this beam was detected by photomultiplier tube 51. As indicated by the ray picture in FIG. 5 the incident ray $A_i$ is normally broken into a transmitted component $A_t$ and a reflected component $A_r$. The ray $A_r$, after multiple reflection, ends up traveling in the opposite direction but parallel to $A_i$. Thus if $A_i$ is a single pulse, the acoustooptic diffraction scheme will indicate its intensity and a finite time later (in this case after a delay of 28$\mu$ sec.), will indicate the energy content of the reflected wave $A_r$. Without the sapphire body 42 in place the incident and reflected wave intensities were found to be equal. The output of the photomultiplier tube 51 for the arrangement is shown in FIG. 6A with the acoustic energy, translated into light intensity, plotted versus time. The height of the short negative pulses is proportional to the acoustic energy in the pulses. It is seen from FIG. 6A that the attenuation of the acoustic wave after one round-trip through transmission medium 41 is small and can be neglected. The fact that both the incident and reflected waves have the same intensity also shows that the polarization of the waves is parallel to the interface so there is no mode conversion.

With the sapphire body 42 bonded in place, the intensity of the reflected wave is reduced to a few percent of the incident wave. This is shown in FIG. 6B. The existence of some reflected wave is attributed to a minor deficiency in the bond quality. However, qualitatively the existence of the Brewster acoustic angle is amply verified by this demonstration.

What is claimed is:

1. An acoustic device including means for propagating an acoustic wave through at least a portion of the device wherein the acoustic wave is transmitted through an interface between two different acoustic media, the acoustic media satisfying the following condition:

$$\frac{1-\frac{\rho_1 v_1}{\rho_2 v_2}}{1-\frac{v_2}{v_1}}\leq 0$$

where $\rho_1$, $\rho_2$, $v_1$ and $v_2$ are the relative densities and acoustic velocities of the two media characterized in that the acoustic wave is made incident on the interface at an angle, $\theta\pm1°$, defined by the following equation:

$$\tan^2\theta=\left(\frac{v_1}{v_2}\right)^2\frac{1-\left(\frac{\rho_1 v_1}{\rho_2 v_2}\right)^2}{1-\left(\frac{v_1}{v_2}\right)^4}$$

2. The device of claim 1 wherein one of the two media is fused quartz.

3. The device of claim 2 wherein the other medium is sapphire and $\theta=39.1°\pm2°$.

References Cited

UNITED STATES PATENTS

| | | | |
|---|---|---|---|
| 2,624,852 | 1/1953 | Forbes et al. | 181—5 |
| 3,383,631 | 5/1968 | Korpel | 330—30 |

FOREIGN PATENTS

| | | |
|---|---|---|
| 46,756 | 3/1963 | Poland. |

BENJAMIN A. BORCHELT, Primary Examiner

T. H. WEBB, Assistant Examiner

U.S. Cl. X.R.

333—32